Feb. 9, 1954         J. E. NAUTA                2,668,764
       METHOD AND DEVICE FOR CONCHING
         A CHOCOLATE MASS AND THE LIKE
              Filed Oct. 3, 1950
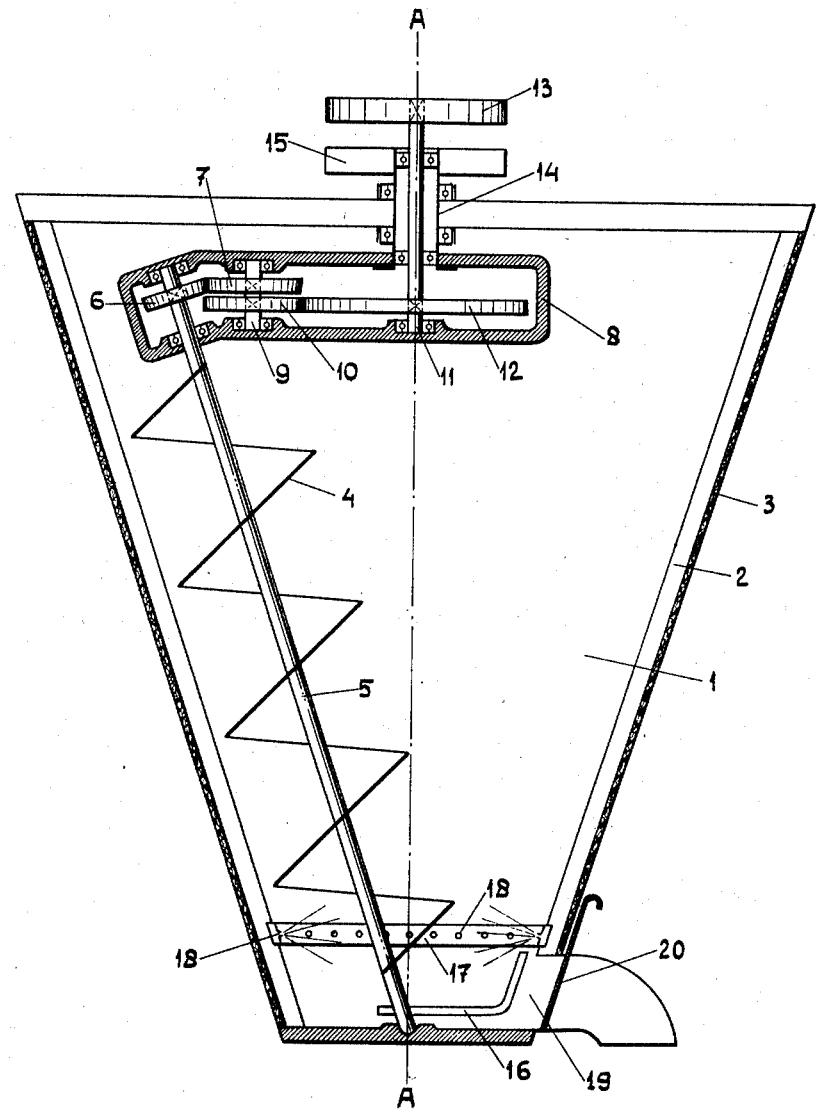
INVENTOR.
JOHANNES EWARDUS NAUTA
BY
           Attorney Patented Feb. 9, 1954

2,668,764

UNITED STATES PATENT OFFICE 2,668,764

METHOD AND DEVICE FOR CONCHING A CHOCOLATE MASS AND THE LIKE

Johannes E. Nauta, Overveen, Netherlands

Application October 3, 1950, Serial No. 188,095

Claims priority, application Netherlands October 14, 1949

2 Claims. (Cl. 99—23)

My invention relates to a method and a device for treating a chocolate mass and the like.

An object of my invention is to improve the process for treating a chocolate mass which is generally known as "conching" and by means of which the taste and quality of said mass are ameliorated.

Surprisingly I have found that the said process of conching can be performed with great advantages by making use of a mixer for pulverous and like materials of the kind as disclosed in my Letters Patent No. 2,345,063.

Thus, according to my invention the process of conching comprises the following steps: introducing a suitable quantity of the chocolate mass to be treated into a vessel with conical upstanding side walls and with a conveying screw arranged in parallel relation to the said conical walls; keeping the mass in the vessel at an elevated temperature; imparting to the said conveying screw a rotatory movement about its own axis, so as to carry up the chocolate mass from the narrow lower end of the vessel to the wider upper end thereof and to drop it back again in the vessel at the said upper end, and producing a relative movement between the vessel and the conveying screw, in such a manner that said screw performs a relative revolving movement along the conical vessel walls about the central axis of the vessel.

Although the conching of a chocolate mass has nothing to do with ordinary mixing, experiments have proved that the treatment of a chocolate mass in a mixer of the above mentioned kind results in a very efficient and accelerated conching of this mass, which is mainly imputable to the fact that the chocolate mass is not only moved by the screw in vertical and horizontal direction along the walls of the vessel, but at the same time is continuously turned and turned over, so that all the time fresh particles of the mass are exposed to the air. Moreover this new method of conching requires but very little power, since the rotating and revolving screw is adapted to readily move and cut with its blades through the mass with which the vessel is filled.

During the treatment of the mass in the vessel a gaseous fluid, such as air, may be driven into the mass, which is preferably effected near the lower end of the vessel.

A further object of my invention is to provide a simple device with which my improved method of conching can be carried into effect. According to my invention said device comprises a vessel with conical upstanding side walls and with at least one conveying screw arranged in parallel relation to said conical walls, means to rotate the conveying screw about its own axis, means to cause a relative revolving movement of the screw along the conical walls about the central axis of the vessel and means for heating the contents of the vessel.

Preferably the said conching device is provided with apertures for introducing a gaseous fluid into the vessel.

My invention will now be more fully described with reference to the accompanying drawing in which an embodiment of the conching device according to my invention has been illustrated by way of example.

The illustrated device comprises a conical vessel 1 of which the upstanding side wall is provided with a jacket 2 for heating the contents of the vessel with steam or another convenient fluid. The steam jacket 2 is surrounded by an insulating jacket 3.

In the vessel 1 is eccentrically arranged a mixing or conveying screw 4 of which the axis 5 is parallel or nearly parallel to the vessel wall. This screw 4 is driven in such a manner that, in addition to a rotatory movement about its own axis, it performs a revolving motion along the conical wall of the vessel. To this end the screw shaft 5 is provided at its upper extremity with a conical gear wheel 6 engaging a corresponding gear wheel 7 fixed to a shaft 9 rotatably mounted in a gear casing 8. The shaft 9 further carries a spur gear 10 engaging a gear 12 keyed upon a centrical driving shaft 11. The driving shaft 11 is put in rotation by a driving wheel 13 situated outside the vessel. The gear casing 8 is rotatably mounted in the vessel 1 by means of a bush 14 of which the upper end is rigidly connected to a second driving wheel 15 driven at a lower speed than the driving wheel 13.

When driving the wheel 13, the screw shaft 5, which is rotatably mounted in the casing 8, is rotated about its own axis through the shaft 11 and the gear transmission 12—6, whereas by the driving of the driving wheel 15 the casing 8 is rotated slowly about the axis A—A of the vessel, thus causing the screw 4 to perform a revolving motion along the conical wall of the vessel.

The screw shaft 5 carries at its lower end one or more stirring or stowing members 16. Thereabove an annular body 17 is led into the vessel wall, said annular body being provided on its inner face with a plurality of spaced nozzles 18. In a manner not shown this annular body 17 is connected to a supply for air, gas or a similar fluid under pressure.

In order to perform the process of conching, the vessel 1 of which the discharge opening 19 is closed by a slide 20 or the like, is filled with the chocolate mass to be treated, which is kept at the required temperature by the steam jacket 2. Upon driving the driving wheels 13 and 15 and setting in operation the screw 4 the mass is continuously drawn from the narrow lower end of the vessel upwards and dropped back again on the remainder of the contents of the vessel, thus causing a vertical circular course of the mass in the vessel. At the same time this mass is moved in horizontal direction by the revolving motion of the screw 4 along the vessel wall. By these continuous vertical and horizontal movements of the mass and its rubbing against the vessel wall, the process of conching is carried out in an effective and very rapid manner. This process may still be forwarded by introducing air and/or gas through the nozzles 18. This air follows the movements of the mass, is thus thoroughly intermingled with said mass and leaves the same again at the upper end of the vessel. Instead of by the nozzles 18, the air may be introduced in any other way, e. g. by means of apertures in the hollow screw shaft 5.

When the process of conching is finished, the discharge opening 19 is opened by the slide 20. The stirring member 16 then extrudes the mass through the opening 19.

It will be evident that the revolving motion of the screw 4 along the vessel wall may be also obtained by rotating the vessel 1 about the axis A—A and keeping the screw, apart from the rotatory movement about its own axis, at a standstill.

What I claim is:

1. The method of conching chocolate comprising the steps of introducing a mass of melted chocolate into a confined space defined by a wall gradually tapering from top to bottom, maintaining the chocolate mass in said confined space at a raised temperature, continuously elevating the heated chocolate mass along a helical path about an axis which is parallel to the tapering wall of said confined space and gyrates about the central vertical axis of said space, and dropping the elevated chocolate mass from the top of said confined space to fall under the influence of gravity through the central portion of said confined space in a direction counter-current to the upward path of the chocolate mass being elevated.

2. The method of conching chocolate according to claim 1; further comprising the step of continuously injecting a gas in finely divided streams into the mass of melted chocolate as the latter is elevated and dropped in said confined space.

JOHANNES E. NAUTA.

References Cited in the file of this patent

UNITED STATES PATENTS

| Number | Name | Date |
|---|---|---|
| 1,486,334 | Hapgood | Mar. 11, 1924 |
| 2,147,184 | Aasted | Feb. 14, 1939 |
| 2,345,063 | Nauta | Mar. 28, 1944 |
| 2,496,557 | Nordenskjold et al. | Feb. 7, 1950 |
| 2,515,150 | Aasted | July 11, 1950 |

FOREIGN PATENTS

| Number | Country | Date |
|---|---|---|
| 585,553 | Great Britain | Feb. 11, 1947 |